(12) United States Patent
Correale et al.

(10) Patent No.: US 7,059,192 B2
(45) Date of Patent: Jun. 13, 2006

(54) PRESSURE SENSOR

(75) Inventors: Raffaele Correale, Turin (IT); Cristian Maccarrone, Turin (IT); Mario Busso, Mappano di Caselle T.se (IT)

(73) Assignee: Varian S.p.A., Turin (IT)

( * ) Notice: Subject to any disclaimer, the term of this patent is extended or adjusted under 35 U.S.C. 154(b) by 81 days.

(21) Appl. No.: 10/971,885

(22) Filed: Oct. 22, 2004

(65) Prior Publication Data

US 2005/0126295 A1 Jun. 16, 2005

(30) Foreign Application Priority Data

Nov. 7, 2003 (EP) .................................. 03425724

(51) Int. Cl.
*G01L 9/00* (2006.01)
(52) U.S. Cl. .......................................... 73/702; 73/715
(58) Field of Classification Search ........... 73/700–756
See application file for complete search history.

(56) References Cited

U.S. PATENT DOCUMENTS

| 4,841,775 A | 6/1989 | Ikeda et al. |
| 5,152,173 A | 10/1992 | Willson |
| 5,426,981 A | 6/1995 | Cook et al. |
| 5,528,939 A | 6/1996 | Martin et al. |
| 6,140,689 A | 10/2000 | Scheiter et al. |
| 6,497,141 B1 * | 12/2002 | Turner et al. .................. 73/105 |
| 6,532,822 B1 | 3/2003 | Boyd |
| 6,901,795 B1 * | 6/2005 | Naguib et al. ........... 73/204.27 |

FOREIGN PATENT DOCUMENTS

| EP | 1 026 492 A2 | 8/2000 |
| EP | 1 530 036 A1 | 5/2005 |

OTHER PUBLICATIONS

Article by Haueis, M., et al., entitled "Packaged Bulk Micromachined Resonat Force Sensor for High Temperature Applications", Proceedings of SPIE, vol. 4019 (2000), pp. 379-387.

* cited by examiner

*Primary Examiner*—Edward Lefkowitz
*Assistant Examiner*—Jermaine Jenkins
(74) *Attorney, Agent, or Firm*—Bella Fishman

(57) ABSTRACT

A pressure sensor is a micro-electro-mechanical vibrating device, with a silicon substrate (15; 15') onto which a single-layer or multilayer vibrating assembly (121; 221; 321) is formed. It comprises an electrode (21; 21'), which makes the assembly to oscillate relative to the substrate at the resonance frequency or at another known frequency, and a detector for detecting the actual frequency and/or amplitude of said oscillation. The actual frequency and/or amplitude are affected by the conditions, in particular the pressure, of the external environment and the variations of the frequency and amplitude with respect to the values set by the electrode is used to measure pressure variations in the surrounding environment.

20 Claims, 4 Drawing Sheets

PRESSURE SENSOR

FIELD OF THE INVENTION

The present invention relates to a pressure sensor.

More particularly, the present invention concerns a pressure sensor comprising a vibrating member, of which the oscillation frequency and amplitude are affected by the pressure conditions of the external environment and can therefore be exploited to measure pressure variations in the surrounding environment.

BACKGROUND OF THE INVENTION

Pressure sensors, or sensors of other physical quantities such as temperature, density and so on, employing a vibrating member are already known. These sensors exploit the influence of the pressure, temperature and/or density conditions of the surrounding environment on the oscillation frequency and amplitude of the vibrating member, and obtain the variations of the physical quantity of interest from the measurement of the oscillation frequency and amplitude deviations from the expected values.

Sensors of the above kind are disclosed for instance in U.S. Pat. No. 5,152,173 "Optical Sensing System", U.S. Pat. No. 5,426,981 "Vibrating Sensor" and U.S. Pat. No. 4,841,775 "Vibratory Transducer".

Yet the known sensors are not suitable for applications in which miniaturising the sensor is necessary in order to measure the pressure in small-sized chambers or in situations where a non-miniaturised sensor could cause non-negligible perturbations on the surrounding environment.

Therefore, it is an object of the present invention to overcome the above drawbacks, by providing a pressure sensor having a very limited overall size, of the order of $10^2$ µm. The pressure sensor as claimed in the appended claims achieves the above and other objects.

SUMMARY OF THE INVENTION

Advantageously, the pressure sensor according to the invention includes a micro-electro-mechanical vibrating device, obtained by means of the technology known for developing MEMS (Micro-Electro-Mechanical Systems) devices and comprising a substrate onto which a single-layer or multilayer oscillating assembly is formed. The substrate and the oscillating assembly may be made, for instance, of silicon, silicon oxide, molybdenum, aluminium, etc.

As known, the term "MEMS" denotes those miniaturised electromechanical systems integrating mechanical components, sensors, drivers, and the related electronics, onboard a silicon substrate. MEMS components are generally obtained through micro-machining processes that selectively etch silicon, by removing selected portions of the silicon wafer, or that add new structural layers, to form the mechanical and electromechanical component. Due to such technology, it has been possible to produce complete systems, such as micro-drivers, on a chip.

Advantageously, the technology for manufacturing MEMS exploits manufacturing methods similar to those used for integrated circuits, and thus it can benefit from similar levels of quality, reliability, sophistication and inexpensiveness typical of integrated circuits.

According to the invention, the variations of the oscillation frequency and/or amplitude of the micro-electro-mechanical vibrating device can be exploited for measuring pressure variations in the surrounding environment.

According to a preferred embodiment, the frequency and/or amplitude variations induce a measurable variation of a parameter of the electric circuit within which the micro-electro-mechanical vibrating device is connected, thereby allowing the pressure variations to be obtained from the behaviour of this variable electric parameter.

BRIEF DESCRIPTION OF THE DRAWINGS

Some preferred embodiments of the invention given by way of non limiting example will be described below, with reference to the accompanying drawings, in which.

DETAILED DESCRIPTION OF THE INVENTION

Figure 1A:
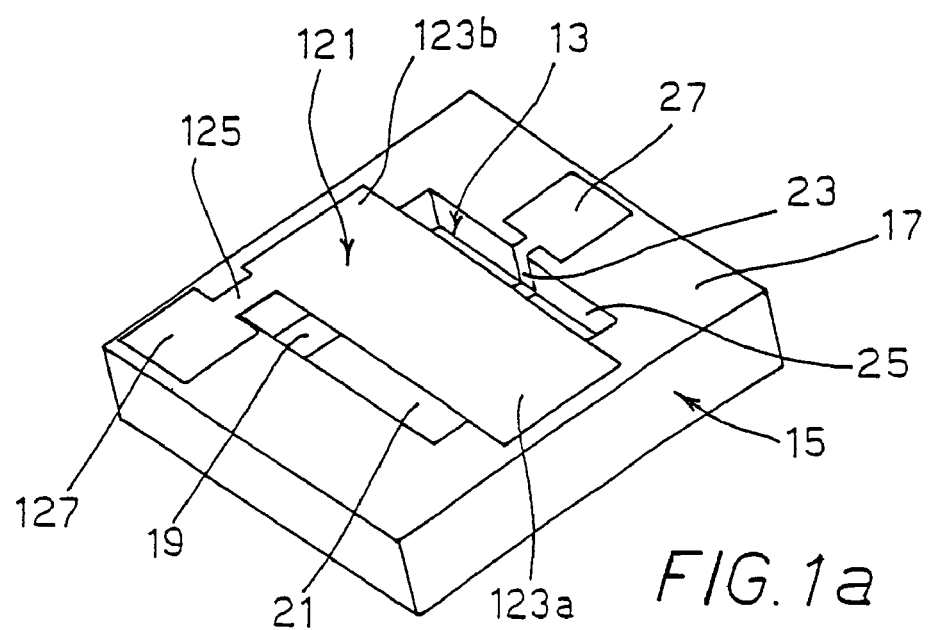
FIG. 1a is a top perspective view of a first embodiment of the micro-electro-mechanical device of the pressure sensor according to the invention.
Figure 1B:
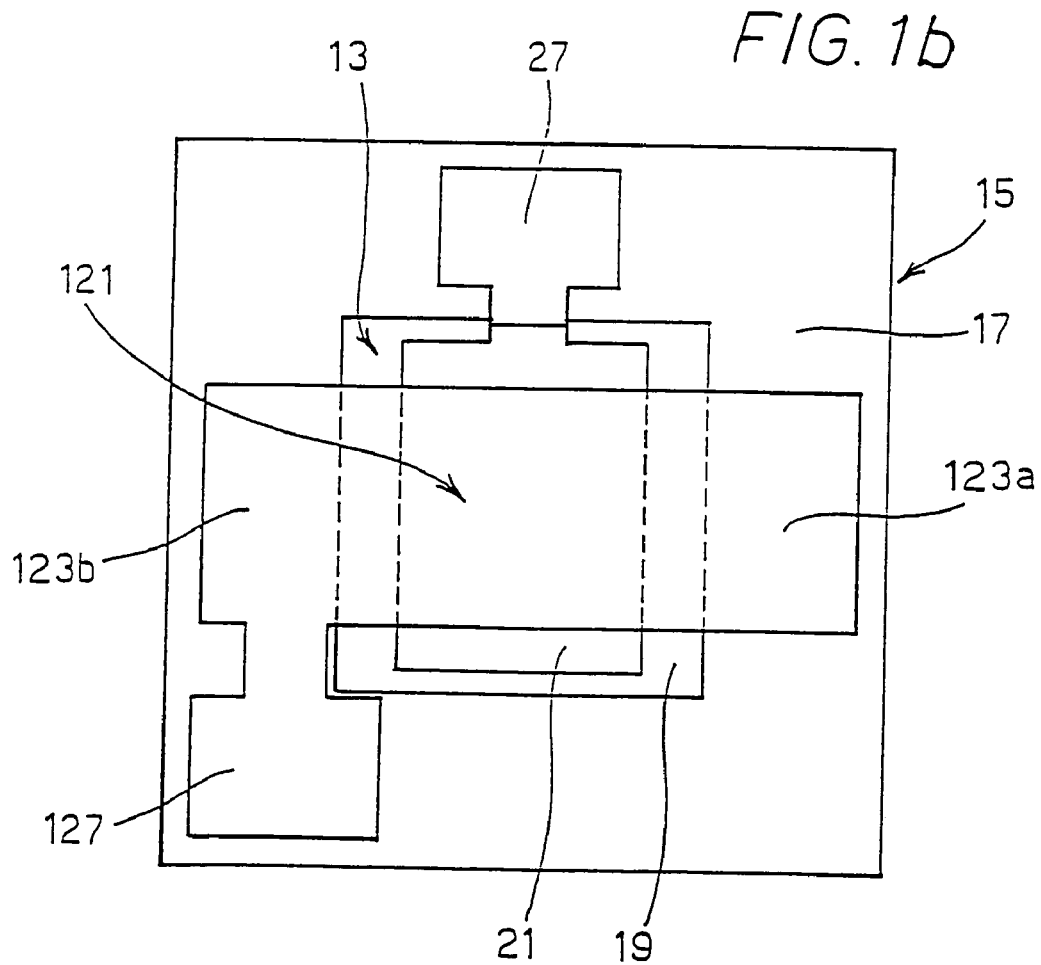
FIG. 1b is a top plan view of the micro-electro-mechanical device shown in FIG. 1.

Referring to FIGS. 1a and 1b, there is shown a first embodiment of the micro-electro-mechanical device of the pressure sensor according to the invention.

According to that embodiment, a vibrating planar resilient membrane 121 is suspended above a cavity 13 formed in a supporting base 15. The membrane 121 has a substantially rectangular shape and is fastened to peripheral rim 17 surrounding cavity 13 in supporting base 15 at two rectangular fastening regions 123a, 123b adjacent to the minor sides of membrane 121. The membrane is further provided with a side extension 125 partly overlapping peripheral rim 17 so as to define a corresponding contact area 127.

Supporting base 15 preferably is a silicon substrate or wafer on which cavity 13 has been formed by conventional etching techniques. A metal control electrode 21 is located inside cavity 13, in contact with bottom 19, and it is provided with a side extension 23 bent against side wall 25 of cavity 13. That extension partly covers peripheral rim 17 of supporting base 15 and defines a corresponding contact area 27.

By applying a voltage signal to areas 27, 127 in control electrode 21 and membrane 121, respectively, an electric field can be produced between control electrode 21 and membrane 121, whereby membrane 121 is attracted towards electrode 21. If the voltage signal applied to contact areas 27, 127 is periodically modulated, the vibration of membrane 121 will be obtained.

Under absolute vacuum conditions, membrane 121 will vibrate at its resonance frequency and amplitude or, if the signal is a sinusoidal signal whose frequencies are different from the resonance frequency, membrane 121 will vibrate at the frequency imposed by the signal.

When departing from the ideal conditions of absolute vacuum, the presence of gas molecules or atoms in the environment surrounding the membrane will affect the frequency and the amplitude of the membrane oscillations, since the free vibration of the membrane will be perturbed by the collisions with atoms and molecules. The higher the number of the atoms and molecules, that is the higher the pressure, the stronger said influence.

Consequently, by measuring the deviations of the vibration frequency and/or amplitude of membrane 121 from the expected values by means of a suitable detector, pressure variations in the surrounding environment can be obtained.

An example of detector of the variations of the vibration frequency and/or amplitude of membrane 121 will be disclosed in detail below.

Suitable materials for manufacturing membrane 121 may be aluminium, molybdenum, $SiO_2$, $Si_3N_4$, Si (single crystalline). Moreover, membranes made of dielectric material, such as $SiO_2$ and $Si_3N_4$, will have a sandwich structure (dielectric-metal-dielectric), with a metal layer sandwiched between two dielectric layers: the membrane vibration can thus be controlled by the electric field.

In an exemplary embodiment of the invention, membrane 121 may have a surface of 100 µm×20 µm and a thickness of 1 µm.

Moreover, membrane 121 shall have sufficiently broad fastening regions 123a, 123b to prevent the membrane from becoming detached from base 15 while vibrating. For instance, in case of membranes of 100 µm×20 µm×1 µm, the fastening regions will preferably have a surface of at least 20 µm×20 µm.

The size of control electrode 21 preferably is such that the attraction force on membrane 121 is applied to about 50% of the membrane surface, preferably over a length in the range 25 µm to 75 µm in the longitudinal direction of membrane 121 and over the whole width of membrane 121. The spacing between membrane 121 and control electrode 21 preferably is in the range 5 µm to 15 µm depending on the material used and depending on the voltage applied to the contact areas of control electrode 21 and membrane 121.

Figure 2:
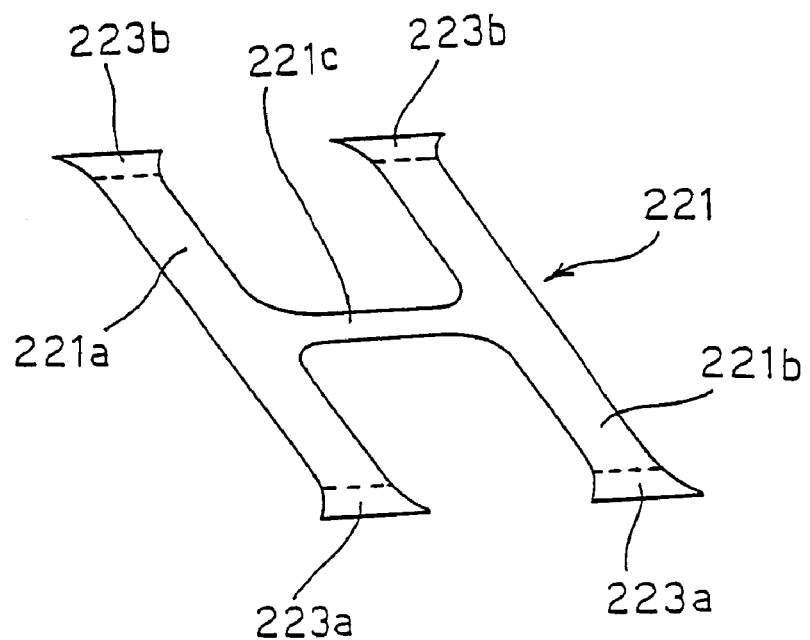
FIG. 2 is a perspective view of a second embodiment of the micro-electro-mechanical device of the pressure sensor according to the invention.

Referring to FIG. 2, where elements identical to those shown in FIGS. 1a and 1b have been omitted, a second embodiment of the invention is shown in which the vibrating pumping stage is obtained by means of a planar, substantially H-shaped resilient membrane 221 comprising two parallel longitudinal beams 221a, 221b and a transversal central beam 221c. Similarly to the embodiment shown in FIGS. 1a and 1b, both parallel beams 221a, 221b are fastened at their respective ends 223a, 223b to peripheral rim 17 of supporting base 15. H-shaped membrane 221 is thus suspended above cavity 13 formed in supporting base 15.

Due to such a configuration, the H-shaped membrane may be imparted a torsional oscillation allowing attaining high resonance frequencies and great amplitudes. Actually, torsional resonance frequency is much higher than the flexion one. For instance, an aluminium membrane 150 µm long, 15 µm wide and 1.5 µm thick will have the following resonance frequencies: flexion $3.5e^5$ Hz, torsion $2.0e^6$ Hz.

Central transversal beam 221c should preferably be light and thin in order the resonance frequency of the assembly is not excessively reduced.

Figure 3:
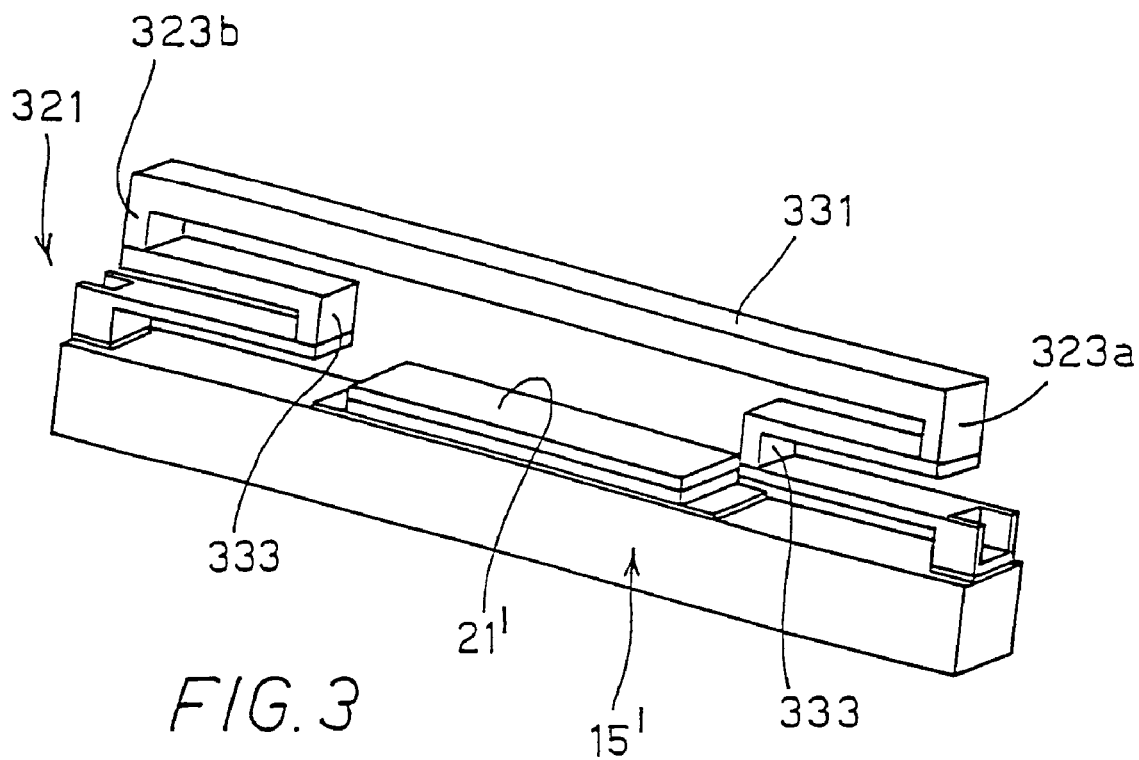
FIG. 3 is a perspective view of a third embodiment of the micro-electro-mechanical device of the pressure sensor according to the invention.

Turning now to FIG. 3, a third embodiment of the invention is shown in which a multilayer vibrating assembly 321 is provided.

According to this embodiment, assembly 321 comprises a substantially rigid membrane 331 supported by substantially S-shaped resilient members or suspension springs 333, located under membrane 331 at respective opposed ends 323a, 323b thereof.

Resilient members 323a, 323b will be in turn fastened to a rectilinear supporting base 15' onto which a control electrode 21' is provided, in order to make assembly 321 vibrate due to the application of an electric field between said electrode 21' and membrane 331.

Figure 4:
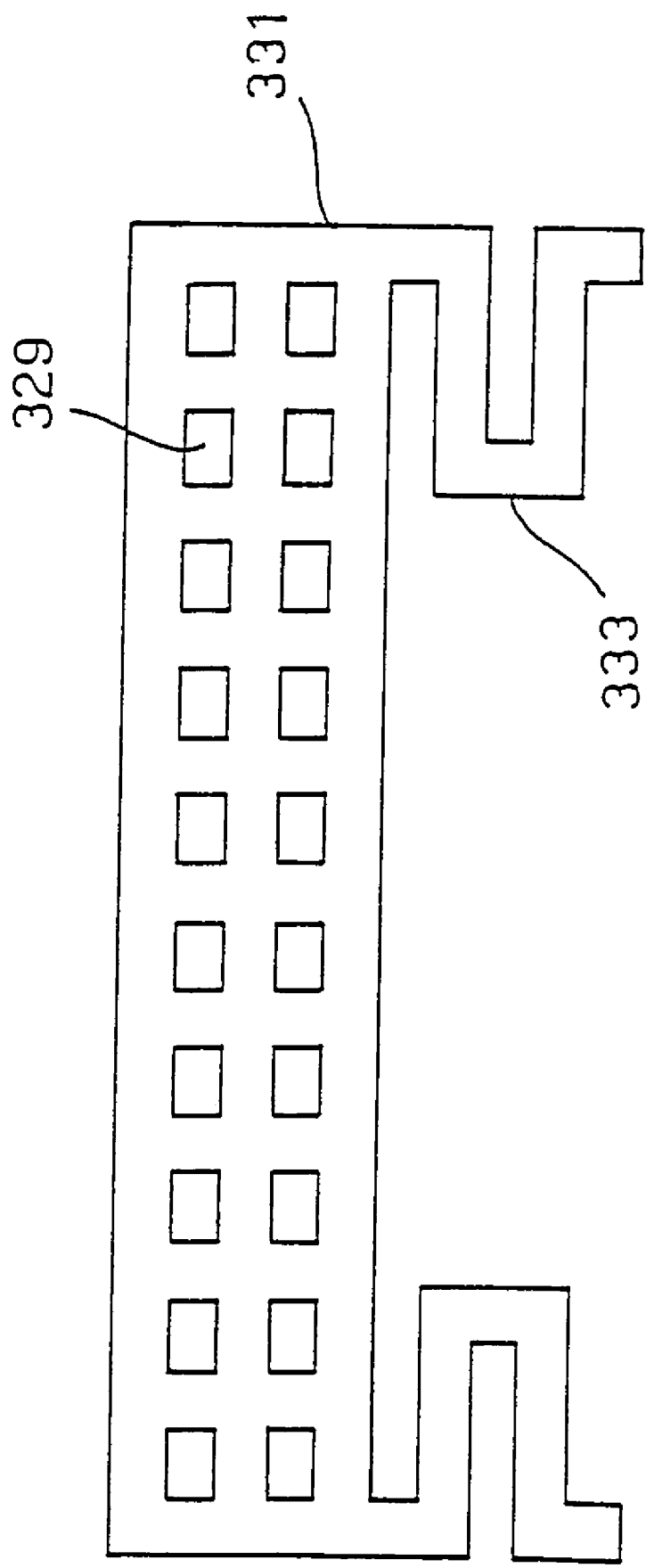
FIG. 4 is a front view of a fourth embodiment of the micro-electro-mechanical device of the pressure sensor according to the invention.

Turning to FIG. 4, which shows a fourth embodiment of the invention, membrane 331 may advantageously have openings 329 giving the membrane a trellis structure conferring sufficient rigidity, so that the membrane is made to oscillate substantially parallel to the plane in which it lies in idle conditions.

With respect to the case of the simple membrane (FIGS. 1a, 1b) or the H-shaped membrane (FIG. 2), the multilayer configuration of the embodiments shown in FIGS. 3 and 4 will advantageously result in the whole surface of membrane 331 having the same sensitivity to the pressure in the surrounding environment.

Actually, membrane 331 remains substantially planar during oscillation and, consequently, the whole membrane surface will be equally affected by the presence of gas atoms or molecules.

In an exemplary embodiment, multilayer assembly 321 may have the following dimensions:
  membrane thickness: 1 µm;
  vibrating surface length: 15–25 µm;
  spring length: 2–3 µm;
  assembly thickness: 5 µm;
  spring thickness: 0.5 µm.

Figure 5:
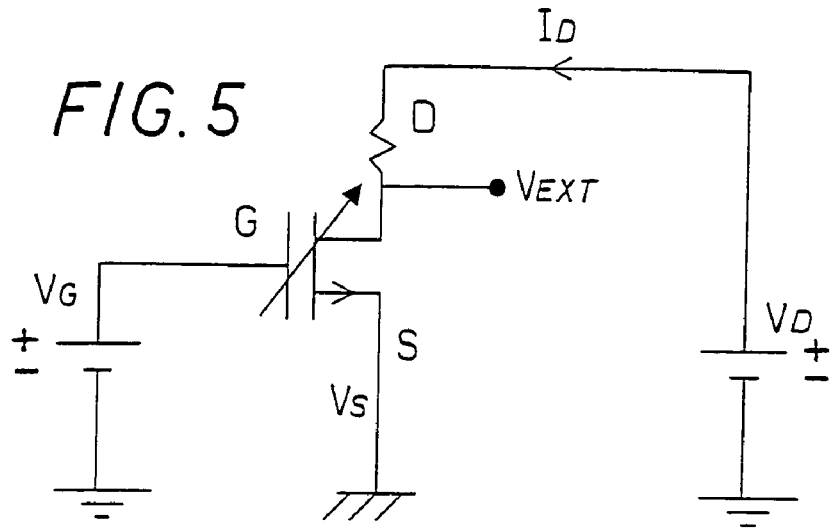
FIG. 5 is a diagrammatic view of the electric circuit of the detector of the pressure sensor according to the invention.

Referring now to FIG. 5, there is schematically shown the electric circuit of a device for detecting the oscillation frequency and amplitude variations of vibrating assemblies 121, 221, 321 of FIGS. 1 through 4.

In the electric circuit shown, the vibrating assembly of the micro-electro-mechanical device is used as gate G of a MOSFET transistor.

As known, a MOSFET transistor, for instance of N-channel type, comprises a low-doped P silicon substrate where two highly-doped N regions (referred to as source S and drain D) are formed. A control electrode, the so-called gate G, is located between such regions. By varying the voltage applied to gate G, the charge distribution and density in the underlying substrate region between source S and drain D are varied by electric field effect, thereby creating a, so called, channel. In the case described above, being the substrate of P type, the channel will be of N type, i.e. it allows an electron current to flow. In case of N-type substrate, the channel created by the potential of gate G will allow a hole current to flow (P-type channel).

Thus, the MOSFET is a device controlling current ID flowing therethrough, which current enters at a source S and flows out at a drain D, by a suitable biasing of the third pole, gate G.

If the vibrating assembly of the micro-electro-mechanical device is used as gate G and said assembly is biased at a constant voltage $V_G$, a voltage signal resulting from the superposition of a constant d.c. signal and a frequency signal will be obtained, since the gate channel extension will vary depending on the oscillation amplitude and frequency of the vibrating assembly.

Consequently, being $V_G$ constant, current $I_D$ will undergo an oscillation proportional to the membrane oscillation.

Current $I_D$ will vary according to relation:

$$I_D = \{W \cdot \mu_{ho} \cdot (\epsilon_r/t_{ox}) \cdot [(V_{GS}-V_T) \cdot V_{DS} - \frac{1}{2}V_{DS}^2] \cdot (1-\lambda \cdot V_{DS})\}/L$$

if $V_{DS} < V_{DS(sat)}$
and according to relation:

$$I_D = \{W \cdot \mu_{ho} \cdot (\epsilon_r/t_{ox}) \cdot (V_{GS}-V_T)^2 \cdot (1-\lambda \cdot V_{DS})\}/2L$$

if $V_{DS} > V_{DS(sat)}$ where: W and L are the (constant) geometrical dimensions of the membrane;

$\mu_{ho}$ is a transconductance parameter;

$t_{ox}$ is the distance between the vibrating structure and the underlying supporting base;

$\epsilon_r$ is the permissivity of the medium between said structure and said base (in vacuum, $\epsilon_r=1$);

$V_{GS}$ is the potential difference between gate and source ($V_G-V_S$);

$V_T$ is the threshold potential, and corresponds to the $V_{GS}$ value above which the presence of moving charges between source and drain is possible, i.e. above which the channel is open; $V_T$ is a function, i. a., of $t_{ox}$;

$\lambda$ is the channel length modulation;

$V_{DS}$ is the potential difference between drain and source ($V_D-V_S$);

$V_{DS(sat)}$ is the saturation value of $V_{DS}$, i.e. the $V_{DS}$ value above which current $I_D$ becomes independent of $V_{DS}$ and only depends on $V_{GS}$ and $V_T$.

During the oscillations of the vibrating assembly, $t_{ox}$ and $V_T$ vary according to a law imposed by the oscillation frequency and amplitude of said assembly and, consequently, also the intensity and the frequency of current $I_D$ vary proportionally to the frequency and/or amplitude variations of said oscillations.

The output signal can be taken, for instance, at $V_{ext}$ and, by measuring the current variations, it is possible to obtain the variations of the vibration frequency and/or amplitude of the micro-electro-mechanical vibrating assembly and, from such variations, the pressure variations in the environment surrounding said assembly.

Figure 6:
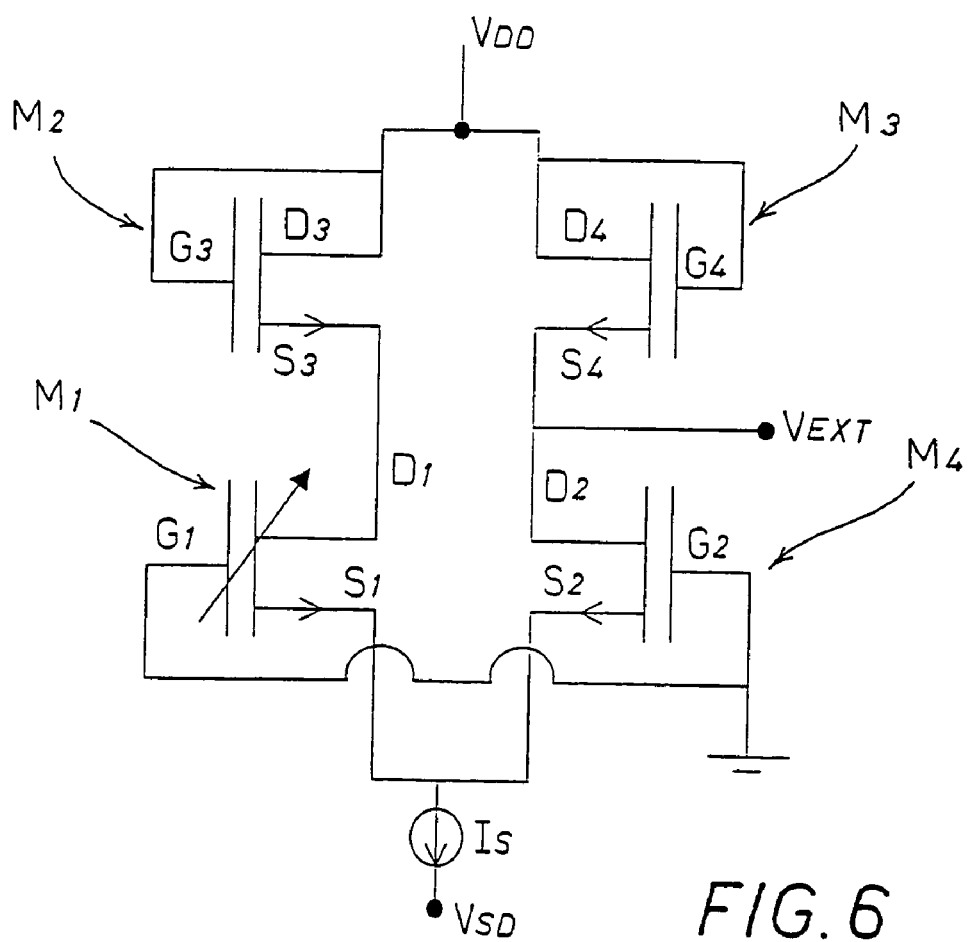
FIG. 6 is a diagrammatic view of the electric circuit of the detector of the pressure sensor according to the invention, according to a variant embodiment.

FIG. 6 schematically shows a possible variant embodiment of the circuit of the detector of the variations of the oscillation frequency and amplitude of micro-electro-mechanical vibrating assembly.

According to such a variant embodiment, said assembly forms gate G1 of a first MOSFET $M_1$. Source $S_1$ of said first MOSFET $M_1$ is connected to source $S_2$ of a second MOSFET $M_1$ (parallel connection) identical to the first MOSFET but having a non-variable gate $G_2$. Drains $D_1$, $D_2$ of said MOSFETs are connected with sources $S_3$, $S_4$ of a third and a fourth MOSFET $M_3$, $M_4$, respectively (series connection). Said third and fourth MOSFETs $M_3$, $M_4$ are identical to each other and act as stabilising resistors making the circuit more stable.

Experimental tests seem to indicate that the pressure sensor according to the invention allows effectively detecting pressure variations in the surrounding environment. More particularly, said sensor may be conveniently used in the pressure range from $10^3$ to $10^{-3}$ mbar. Within said range, the variations of the vibration frequency and/or amplitude of the vibrating assembly are linearly dependent on the pressure variations generating them.

What is claimed is:

1. A pressure sensor of a high vacuum, comprising:
   a vibrating assembly (121; 221; 321) including a micro-electro-mechanical device (MEMS);
   a stationary supporting base (15; 15') fastened to said vibrating assembly;
   an electrode (21; 21'), which makes said vibrating assembly to oscillate relative to said supporting base at a predetermined frequency and amplitude when a variable electric filed is produced between said electrode and said vibrating assembly; and
   a device detecting the deviations of the oscillation frequency and amplitude from said known frequency and amplitude, said device including an electric circuit with a MOSFET transistor (M, $M_1$), said vibrating assembly is a control electrode or gate (G) of said MOSFET transistor, which controls the width of a channel thereof depending on a value of said predetermined frequency and amplitude.

2. The pressure sensor as claimed in claim 1, wherein said supporting base (15; 15') comprises a silicon wafer.

3. The pressure sensor as claimed in claim 2, wherein said electrode (21) is placed between said supporting base (15; 15') and said vibrating assembly (121; 221; 321) of said micro-electro-mechanical device.

4. The pressure sensor as claimed in claim 1, wherein said variable electric field is a sinusoidal field having a frequency equals to a resonance frequency of said vibrating assembly.

5. The pressure sensor as claimed in claim 1, wherein said electrode is positioned within a cavity (13), which is formed in said supporting base below said vibrating assembly.

6. The pressure sensor as claimed in claim 1, wherein said vibrating assembly is a planar resilient membrane.

7. The pressure sensor as claimed in claim 6, wherein said membrane is substantially rectangular and is fastened to said supporting base at its ends (123a, 123b) corresponding to minor sides of said rectangle.

8. The pressure sensor as claimed in claim 6, wherein said membrane is substantially H-shaped and is fastened to said supporting base at its four ends (223a, 223b).

9. The pressure sensor as claimed in claim 8, wherein said H-shaped membrane is submitted to a torsional vibration.

10. The pressure sensor as claimed in claim 9, wherein said membrane is fastened to said supporting base along a peripheral rim (17) surrounding said cavity (13) and is suspended above said cavity.

11. The pressure sensor as claimed in claim 10, wherein said membrane comprises a side extension (125) partly overlapping said peripheral rim defining a corresponding first contact area (127).

12. The pressure sensor as claimed in claim 10, wherein said electrode comprises a side extension (23) such that the electrode partly overlaps the peripheral rim (17) of said supporting base (15) defining a corresponding second contact area (27), an appropriate voltage signal is applied to said second contact area generating the variable electric field between said vibrating assembly and said electrode.

13. The pressure sensor as claimed in claim 1, wherein said vibrating assembly comprises a rigid membrane (331) supported by resilient members or suspension springs (333) placed between said membrane and said supporting base, said resilient members being fastened to said supporting base.

14. The pressure sensor as claimed in claim 13, wherein said membrane and said supporting base have a substantially rectilinear, parallelepiped-like shape.

15. The pressure sensor as claimed in claim 14, wherein said resilient members are S-shaped.

16. The pressure sensor as claimed in claim 14, wherein said membrane has a trellis structure with openings (329).

17. The pressure sensor as claimed in claim 1, wherein the gate ($G_1$) of said MOSFET transistor ($M_1$) is connected in parallel with a second MOSFET transistor ($M_2$).

18. The pressure sensor as claimed in claim 17, wherein said second MOSFET transistor ($M_2$) is similar to said first MOSFET transistor ($M_1$), except that it comprises a stationary gate ($G_2$).

19. The pressure sensor as claimed in claim 18, wherein said first and said second MOSFET transistors ($M_1$, $M_2$) are connected in series with a third and a fourth MOSFET transistor ($M_3$, $M_4$), respectively, said third and fourth MOSFET transistors.

20. The pressure sensor as claimed in claim 19, wherein said third and fourth MOSFET transistors are identical to each other.

* * * * *